Feb. 6, 1968 R. L. BALLARD 3,367,378
HACKSAW HAVING A REVERSIBLE REAR POST TO ACCOMMODATE
DIFFERENT LENGTH BLADES
Filed Jan. 10, 1967 2 Sheets-Sheet 1

INVENTOR.
Robert L. Ballard
BY
ATTORNEYS

Feb. 6, 1968 R. L. BALLARD 3,367,378
HACKSAW HAVING A REVERSIBLE REAR POST TO ACCOMMODATE
DIFFERENT LENGTH BLADES
Filed Jan. 10, 1967 2 Sheets-Sheet 2
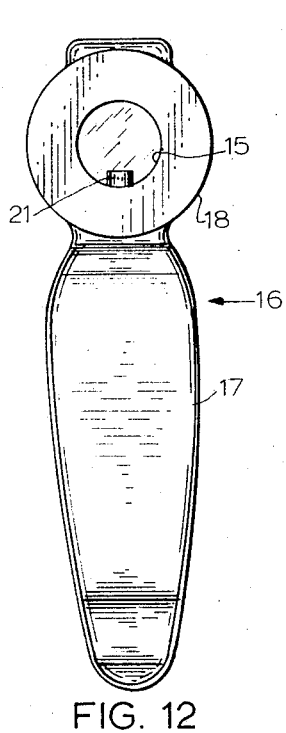
FIG. 12
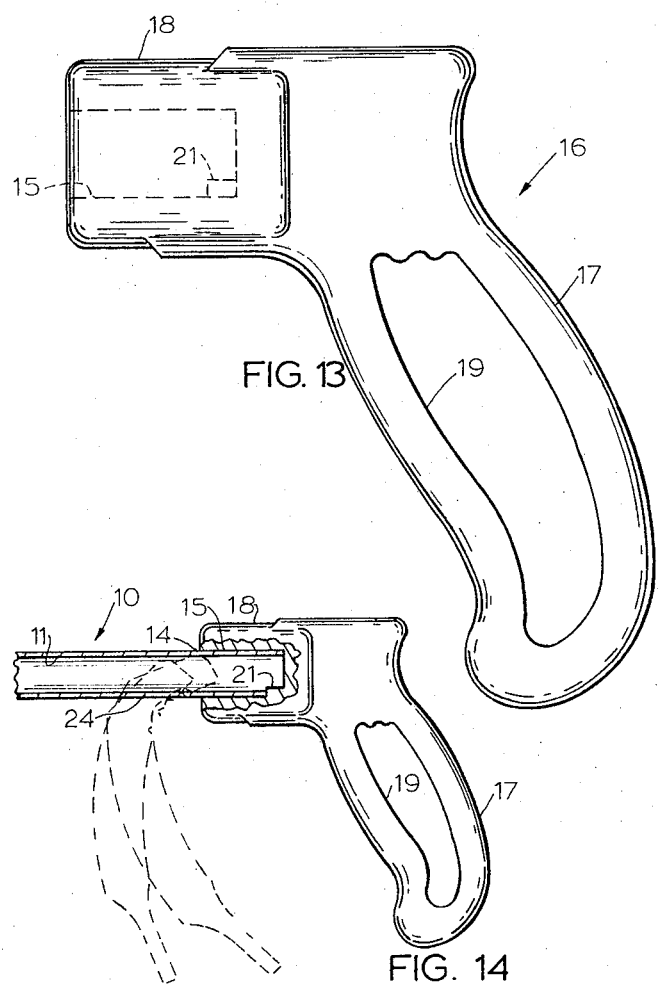
FIG. 13
FIG. 14
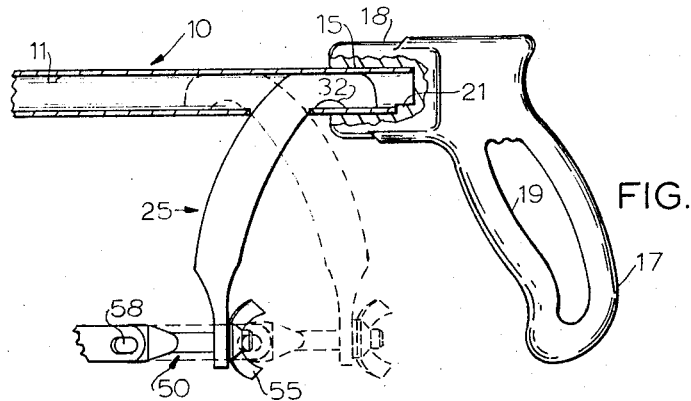
FIG. 15
INVENTOR.
Robert L. Ballard
BY
ATTORNEYS

United States Patent Office 3,367,378
Patented Feb. 6, 1968

3,367,378
HACKSAW HAVING A REVERSIBLE REAR POST TO ACCOMMODATE DIFFERENT LENGTH BLADES
Robert L. Ballard, Pittsburgh, Pa., assignor to H. K. Porter Company, Inc., Pittsburgh, Pa., a corporation of Delaware
Filed Jan. 10, 1967, Ser. No. 608,290
2 Claims. (Cl. 145—34)

ABSTRACT OF THE DISCLOSURE

A hacksaw frame is provided with a fixed forward post and a reversibly mounted, special shaped rear post, the blade being supported between the posts and the frame being adjustable for different length blades by changing the position of the rear post.

BACKGROUND OF THE INVENTION

Field of invention

This invention relates to saw frames and to tubular hacksaw frames and, more particularly, to a hacksaw having an L-shaped tubular frame and a reversibly mounted rear post which is frictionally received by the tubular frame and, in combination therewith, forms a U-shaped composite frame adapted to accommodate two sizes of saw blades by the selective positioning of the rear post.

Description of prior art

Hacksaws of the U-shaped frame type which are adapted to accommodate a plurality of sizes of blades have been known in the art for some time. Hacksaws of this type include those which have a telescoping U-shaped frame which may be adapted to accommodate various lengths of blades, those which have the rear post slidably mounted on the U-shaped frame and which may be secured to the frame at various positions along its length, and those which have adjustable front and rear stretchers which connect the blade to the frame. Generally, such hacksaws of the prior are have the disadvantages of being unduly complicated and of requiring an excessive amount of time to convert the U-shaped frame to receive a different blade length.

SUMMARY OF THE INVENTION

The present invention overcomes the foregoing disadvantages by providing an L-shaped tubular frame which includes a short leg serving as a front post and a long, elongated leg to the end of which is integrally secured a handle. The long leg is provided with an opening substantially adjacent the handle which is adapted to receive a rear post and which aligns the rear post in the plane of the short leg. The rear post is somewhat curved or L-shaped having short and long arms intersecting obliquely. The short arm is adapted to be inserted through the opening and to reside longitudinally in the long leg. The rear post in combination with the L-shaped tubular frame forms a composite U-shaped frame which, across the open end thereof, is adapted to receive a cutting blade of a desired length. Since the long arm of the rear post is also obliquely positioned relative the long leg of the frame, the reversing of the short arm of the rear post in the long leg of the frame changes the distance between the extremities of the long arm and the short leg thereby adapting the hacksaw to receive different lengths of blades.

Therefore, an object of this invention is to provide a hacksaw with a reversible rear post whereby the hacksaw may accommodate different lengths of blades.

Another object of this invention is to provide a hacksaw with a U-shaped frame in which the rear post thereof comprises a removable part thereof and is securely received by the frame in a selected one of a plurality of positions.

Further objects and advantages of the invention will be set forth or become apparent from the following description of a preferred embodiment thereof, to which the invention is by no means restricted, reference being made to the accompanying drawings in which:

DESCRIPTION OF THE DRAWINGS

FIGURE 12 is a front end view of the handle;

FIGURE 13 is a plan view of the handle;

FIGURE 14 is a fragmentary partial section view of the handle and L-shaped tubular frame showing in skeletons selected positions through which the reversible rear post is moved when being inserted into the tubular frame; and FIGURE 15 is a fragmentary partial section view of the tubular frame and handle and showing the reversible rear post receiving the cutting blade and alternatively, in skeletons, in a second position for receiving a cutting blade of a longer length.

DESCRIPTION OF THE PREFERRED EMBODIMENT

Figure 1:
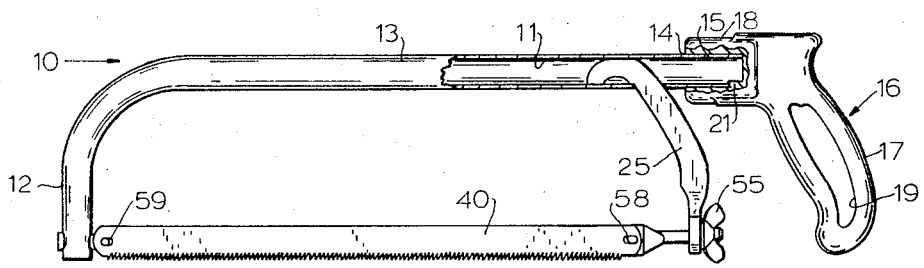
FIGURE 1 is an elevation view of the hacksaw partially in section showing the reversible rear post being received by the L-shaped tubular frame.
Figure 2:
FIGURE 2 is a bottom view of the L-shaped frame showing the opening through which a portion of the reversible rear post passes.
Figure 3:
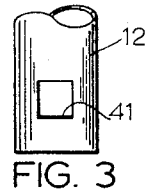
FIGURE 3 is a fragmentary enlarged view of the L-shaped tubular frame showing the square opening which receives the front stretcher.
Figure 10:
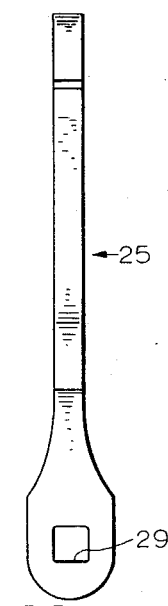
FIGURE 10 is a front end view of the reversible rear post.
Figure 11:
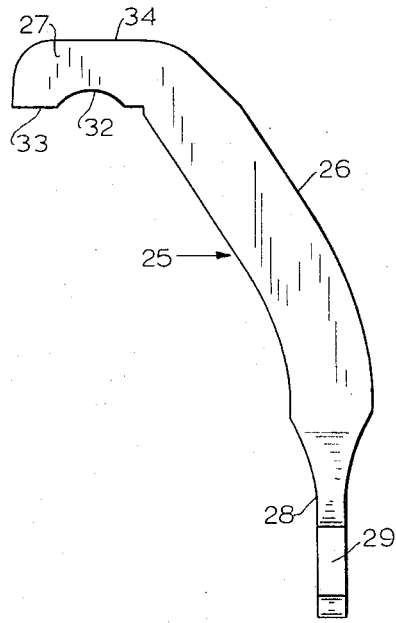
FIGURE 11 is a plan view of the reversible rear post showing the oblique intersection between the long and short arms.
Figure 4:
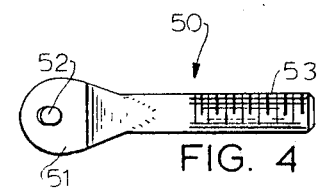
FIGURE 4 is a plan view of the rear stretcher.
Figure 5:
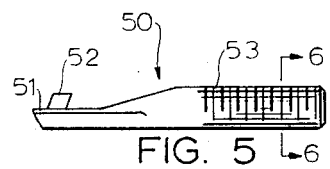
FIGURE 5 is an elevation view of the rear stretcher.
Figure 6:
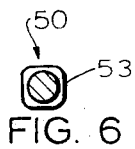
FIGURE 6 is a section view taken along line 6—6 of FIGURE 5 and showing the square threaded body of the rear stretcher.
Figures 7, 9:
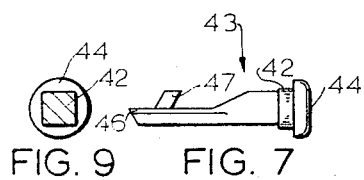
FIGURE 7 is an elevation view of the front stretcher.
FIGURE 9 is a section view taken along line 9—9 of FIGURE 8 and showing a square shoulder.
Figure 8:
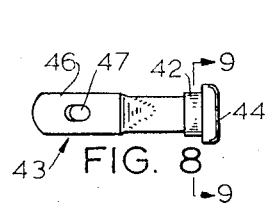
FIGURE 8 is a plan view of the front stretcher.

The hacksaw of this invention includes an L-shaped tubular frame 10 which is provided with a cylindrical passageway 11 that extends the length of the same. Tubular frame 10 is comprised of a short leg 12 which serves as the forward post and an elongated, long leg 13 which serves as the backbone for the hacksaw. Exposed end 14 of long leg 13 is received by an opening 15 in handle 16. Handle 16 is comprised of a hand receiving portion 17 and a cylindrical portion 18 having the opening 15. Hand receiving portion 17 may be provided with an opening 19 as shown in FIGURE 13 which is designed to reduce the weight of the same and to provide a savings in material without detracting from the strength thereof. Cylindrical portion 18 is provided with an aligning block 21 which is located in opening 15 and which is adapted to receive slot 22 in elongated leg 13 so as to properly position short leg 12 relative handle 16.

In order to complete the U-shaped frame, L-shaped tubular frame 10 is provided with a reversible rear post 25. Rear post 25 includes an arcuated long arm 26, an integral short arm 27 which is obliquely positioned relative to long arm 26 and a transversely disposed bolt receiver 28, having square opening 29, which forms the other extremity of long arm 26. Short arm 27 is provided with parallel sides 33 and 34 with side 33 having an arcuated indention 32. Parallel sides 33 and 34 adapt short arm 27 to reside longitudinally in tubular frame 10 and arcuated indention 32 allows short arm 27 to be inserted into and withdrawn from passageway 11 through slot 24 in elongated leg 13.

Once rear post 25 has been connected to L-shaped frame 10 thereby forming a U-shaped structure, the U-shaped structure is adapted to receive a cutting blade 40, having slots 58 and 59, across the open ends of the U. Short leg 12 is provided with a square opening 41 which receives and securely positions square shoulder 42 of front stretcher 43. Nub 44 prevents front stretcher 43 from being pulled through square opening 41. Front stretcher 43 is further provided with a flat aligning surface 46 and a blade receiving pin 47 which protrudes outwardly and forwardly from aligning surface 46. Rear stretcher 50 is comprised of a flat aligning surface 51 and a pin 52 protruding rearwardly therefrom and a substantially square threaded body 53 which is adapted to be slidably received by and partially housed in square opening 29 of rear post 25. A wing nut 55 is adapted to be threadably mounted on threaded body 53 so as to tighten blade 40 when mounted on pins 52 and 47 by means of slots 58 and 59.

In operation, end 14 of elongated leg 13 is positioned in opening 15 of handle 16 and is held therein either by an epoxy cement or other securing means commonly known in the art. In reference to FIGURES 14 and 15, rear post 25 is received by frame 10 by inserting short arm 27 through opening 24 in elongated leg 13 after it has been determined what length of blade 40 is to be used. Blade 40, which has openings 58 and 59 mounted on pins 52 and 47 of front and rear stretchers 50 and 43, respectively, is securely suspended between the extremities of short leg 12 and long arm 26 by tightening wing nut 55 on threaded body 53. If a longer length of blade were desired, rear post 25 would be withdrawn from passageway 11 of tubular frame 10, reversed, and longitudinally reinserted into passageway 11 whereupon wing nut 55 would again be threadably received by shaft 53 and tightened upon the same.

It is to be understood that the invention is not to be restricted to the preferred embodiment described in the foregoing and as illustrated in the accompanying drawings, since various changes and modifications are possible without departing from the scope and spirit of the invention as defined in and by the appended claims.

What is claimed is:
1. A light weight hacksaw comprising:
 (a) an L-shaped frame including a short leg adapted to serve as a front blade support post and an elongated hollow leg defining a longitudinally extending cavity and having an opening therein communicating with said cavity;
 (b) a handle securely mounted on the extremity of said elongated leg and positioned substantially adjacent said opening;
 (c) an L-shaped rear blade support post having short and long arms intersecting obliquely, said short arm adapted to be inserted through said opening and to be releasably and reversibly received by and longitudinally positioned in said cavity in either of two post positions, the position of said long arm and the distance between said short leg front post and said long arm rear post being dependent upon the position of said short arm thereby enabling said distance to be varied by reversing the position of said short arm in said cavity;
 (d) blade gripping means mounted on the extremities of said short leg and said long arm; and
 (e) a cutting blade secured in said blade gripping means.

2. The hacksaw of claim 1 wherein said short arm includes upper and lower parallel surfaces with the distance between said surfaces being slightly less than the width of said cavity, said lower surface being provided with an arcuated indention for a portion of its length intermediate its ends, said indention adapting said short arm to be inserted into said cavity by means of a pivoting movement.

References Cited
UNITED STATES PATENTS

| | | | |
|---|---|---|---|
| 1,792,024 | 2/1931 | Maly | 145—34 |
| 1,817,980 | 8/1931 | Forsberg et al. | 145—33 |
| 2,580,896 | 1/1952 | Dohner | 145—34 |

MILTON S. MEHR, *Primary Examiner.*